(12) United States Patent
Haney

(10) Patent No.: US 9,677,620 B2
(45) Date of Patent: Jun. 13, 2017

(54) LIFT CYLINDER YOKE BEARING INSTALLER FOR A BULLDOZER AND METHOD OF INSTALLATION

(71) Applicant: Ronnie Haney, Douglas, WY (US)

(72) Inventor: Ronnie Haney, Douglas, WY (US)

(*) Notice: Subject to any disclaimer, the term of this patent is extended or adjusted under 35 U.S.C. 154(b) by 187 days.

(21) Appl. No.: 13/965,417

(22) Filed: Aug. 13, 2013

(65) Prior Publication Data

US 2015/0047200 A1 Feb. 19, 2015

(51) Int. Cl.
*F16C 43/00* (2006.01)
*F15B 15/04* (2006.01)
*F16C 29/02* (2006.01)
*E02F 3/76* (2006.01)

(52) U.S. Cl.
CPC ............. *F16C 43/00* (2013.01); *F15B 15/04* (2013.01); *F16C 29/02* (2013.01); *E02F 3/7636* (2013.01); *Y10T 29/497* (2015.01); *Y10T 29/49696* (2015.01)

(58) Field of Classification Search
CPC .......... F16C 43/00; F16C 29/02; F15B 15/04; Y10T 29/497; Y10T 29/49696; E02F 3/7636
See application file for complete search history.

(56) References Cited

U.S. PATENT DOCUMENTS

| 2,867,922 A | * | 1/1959 | Allin | 172/831 |
| 3,391,747 A | * | 7/1968 | Long | 172/831 |
| 3,572,446 A | * | 3/1971 | Mazzarins | 172/830 |
| 3,897,833 A | * | 8/1975 | Frisbee | 172/830 |
| 4,549,829 A | * | 10/1985 | Springer et al. | 403/57 |

* cited by examiner

*Primary Examiner* — Ryan J Walters
(74) *Attorney, Agent, or Firm* — The Law Office of Jerry D. Haynes

(57) ABSTRACT

A system and method that includes a device that is used in a particular method to install bearings into a lift cylinder yoke bore. The device includes use of a hollow bore hydraulic push cylinder that maneuvers a push plate along a threaded rod. The push plate sinks or sets into the bearing and applies pressure through the movement of the hydraulic push cylinder to place the bearing into a fit position without the abrasion that is usually associated with the installation of bearings into the lift cylinder yoke bore. The threaded rod attaches to a threaded bushing that is inserted into the bore and secured with the use of a pin. The threaded rod extends out of the bore opening and allows for the attachment of a bearing, push plate, hydraulic push cylinder, washer and nut.

3 Claims, 3 Drawing Sheets

LIFT CYLINDER YOKE BEARING INSTALLER FOR A BULLDOZER AND METHOD OF INSTALLATION

BACKGROUND OF THE INVENTION

Field of Invention

The present invention provides an installer tool and method of installation for the replacement of bearings with a lift cylinder yoke bore.

Description of Related Art

Tractors, bulldozers and other heavy machinery typically include a front shovel or a push blade to move dirt, coal or gravel. A lift cylinder that may be typically found on a bulldozer or similar tractor provides a means to lift the push blade during operation. The lift cylinder is held in place through the use of a lift cylinder yoke that attaches to a hard nose of the bulldozer. Most lift cylinder yokes include bearings to support the various torques that are applied to the lift cylinder and yoke during operation. Over time these bearings become worn and it is necessary to remove and replace the bearings. The process of replacing the bearings can be quite tedious and many times the installation of the new bearings require the use of a hammer and may involve beating on the bearing thus causing damage and swelling to the bearing during installation. The installation may further lead to the cylinder yoke not fitting properly. Consequently there is a need for an effective safe method to install lift cylinder yoke bearings in a less damaging and safer manner.

SUMMARY OF THE INVENTION

The present invention relates to an installer tool method of installation that includes a device that is used in a particular method to install bearings into a lift cylinder yoke bore. The device includes use of a hollow bore hydraulic push cylinder that maneuvers a push plate along a threaded rod. The push plate sinks or sets into the bearing and applies pressure through the movement of the hollow bore hydraulic push cylinder to place the bearing into a fit position without the abrasion that is usually associated with the installation of bearings into the lift cylinder yoke bore. The threaded rod attaches to a threaded bushing that is inserted into the bore and held in place with a pin. The threaded rod extends out of the bore opening and allows for the attachment of a small bearing, small push plate, hollow bore hydraulic push cylinder, washer and nut. Once a small bearing is installed, the device is disassembled and a large bearing, large push plate, hollow bore hydraulic push cylinder, washer and nut is placed upon the threaded rod. The hydraulic push cylinder applies pressure moving the push plate along the threaded rod and allows for the installation of the large bearing. The device is disassembled and removed. This method ensures for a smooth, safe and effective means to install bearings into a lift cylinder yoke bore.

DETAILED DESCRIPTION

The present invention relates to an installer tool and method of installation that includes a device that is used in a particular method to install bearings into lift cylinder yoke bore. The present invention includes use of a hollow bore hydraulic push cylinder that maneuvers a push plate along a threaded rod. The push plate sinks or sets into the opening of the bearing and applies pressure through the movement of the hydraulic push cylinder and places the bearing into a fit position without the abrasion that is usually associated with the installation of bearings into the yoke bore. The threaded rod attaches to a threaded bushing that is inserted into the bore and held in place through the use of a pin. The rod extends out of the bore opening and allows for the attachment of a small bearing, small push plate, hydraulic push cylinder, washer and nut. Once a small bearing is installed, the device is disassembled and a large bearing with a large push plate, hydraulic push cylinder, washer and nut is placed upon the threaded rod. The hydraulic push cylinder then applies pressure moving the push plate along the threaded rod and allows for the installation of the large bearing. The device is disassembled and removed. This method ensures for a smooth, safe and effective means to install bearings into a lift cylinder yoke bore.

Figure 1:
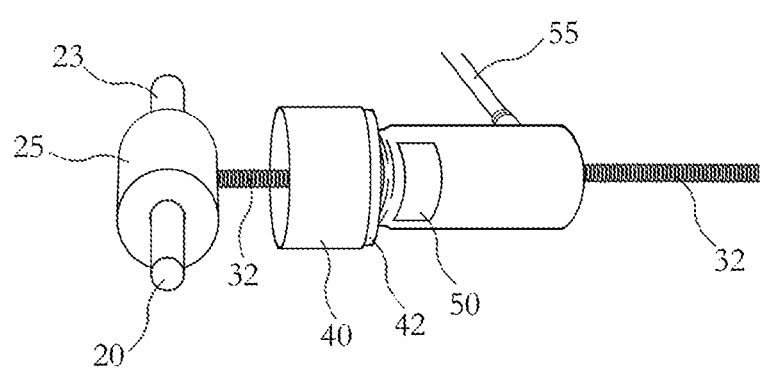
FIG. 1 depicts a device for installing bearings in a lift cylinder yoke bore in accordance with the present invention.

With respect to FIG. 1, an overall assembly of the components of the lift cylinder yoke bearing installation device is depicted. The bearing installation device includes a threaded bushing 25 that has an opening that allows for the insertion of a pin 20. The pin 20 includes a flat end 23 that locks the pin 20 into place during bearing installation. Attached to the threaded bushing 25 is a threaded rod 32. The threaded rod 32 as shown extends through a hydraulic push cylinder 50 and a small push plate 42 that abuts a small bearing 40. This overall assembly provides a prospective view of the components that are used to push the bearings into the lift cylinder yoke bore.

Figures 2A, 2B:
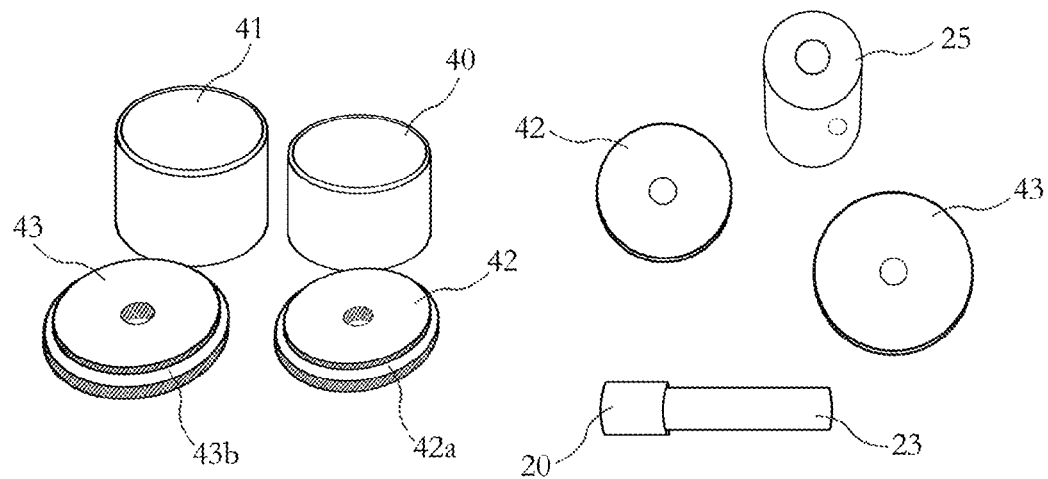
FIG. 2A depicts bearings and push plates where the push plates are used in conjunction with the device of FIG. 1 for the installation of the bearings within a lift cylinder yoke bore.
FIG. 2B depicts components of the lift cylinder yoke bearing installer according to the present invention.

FIG. 2A depicts the small bearing 40 and a large bearing 41. Adjacent to each bearing are the respective push plates, small push plate 42 and large push plate 43, that are used to push the bearings into the lift cylinder yoke bore. Each push plate includes a lip, lip 42a and lip 43b. These lips allow for the placement of the respective bearing onto the push plate. All components of the invention are shown in FIG. 2B such as the pin 20 is depicted shown with the flat end 23. Further a top view of the threaded bushing 25 is also shown along with the push plate 42 and push plate 43.

Figure 3:
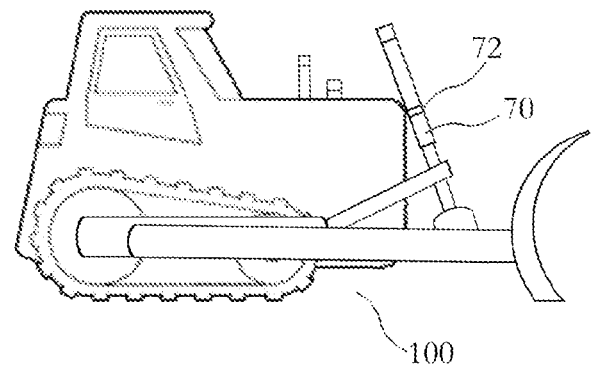
FIG. 3 depicts a bulldozer that includes a lift cylinder yoke.
Figure 4:
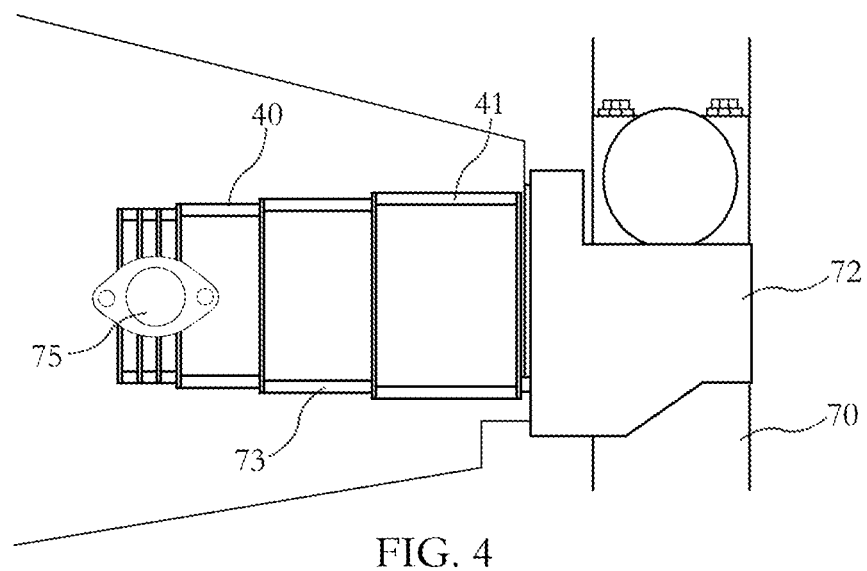
FIG. 4 depicts a detailed sectional view of a lift cylinder yoke attached to a lift cylinder in accordance with the present invention.

FIG. 3 shows a dozer 100 that has a lift cylinder 70 with a lift cylinder yoke 72. This figure provides a prospective view to show the environment of the lift cylinder 70 and lift cylinder yoke 72. A close-up view of the lift cylinder 70 and lift cylinder yoke 72 is shown in FIG. 4. FIG. 4 shows a cutaway of a bore 73 and a lift cylinder yoke 72. Within the bore 73 the small bearing 40 and large bearing 41 are shown. These bearings may be placed into the bore through the use of the assembled device shown in FIG. 1. Further a yoke keeper pin 75 is depicted. During use of the device depicted in FIG. 1, the yoke keeper pin 75 is removed and replaced with the pin 20. Attached to the pin 20 is the threaded bushing 25 so that the threaded bushing 25 is exposed in the opening of the bore 73. The threaded bushing 25 includes an opening that receives the threaded rod 32 as shown in FIG. 1. So after the threaded rod 32 is screwed into the threaded bushing 25 and is placed within the bore 73 far enough for pin 20 to be inserted into threaded bushing 25, the base components are in a position to receive a bearing, push plate, hydraulic push cylinder, washer and nut. The hydraulic push cylinder 50 receives hydraulic fluid through a hose 55 as shown in FIG. 1.

Figure 5:
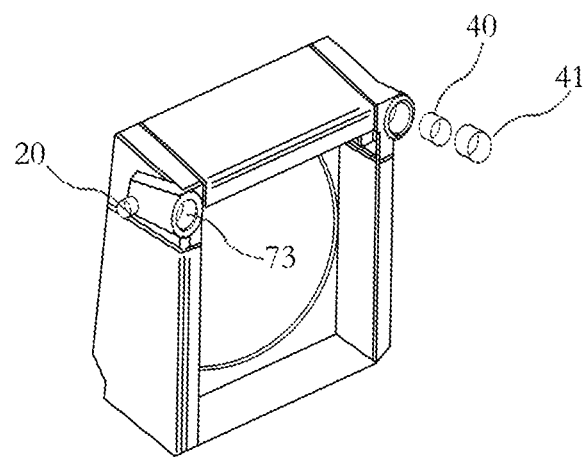
FIG. 5 depicts a perspective view of the lift cylinder yoke bore and its placement on a hard nose of a Cat D11 dozer.

The threaded rod 32 is screwed into the threaded bushing 25 and is inserted into bore 73 down to the deep end. Pin 20 is inserted into threaded bushing 25 to secure it in the bore 73. Next the small bearing 40 is placed over the threaded rod with the small push plate attached thereto. The push plate 42 includes the lip 42*a* that inserts into the small bearing 40 opening. Once the bearing and push plate are connected onto the threaded rod the seating of the small bearing into the bore 73 may begin. The hydraulic push cylinder is placed upon the threaded rod and a washer and nut are placed onto the rod against the hydraulic push cylinder. The small bearing 40 may then be lined up inside the bore and the pressure of the hydraulic push cylinder causes the movement of the plate along the rod and therefore allows for the placement of the bearing into a fit position in the bore 73 as shown in FIG. 4. Then the washer, nut, hydraulic push cylinder and small push plate are removed from the threaded rod. Then the large bearing, large push plate, hydraulic push cylinder, washer and nut are placed onto the threaded rod. The hydraulic push cylinder 50 receives hydraulic fluid through a hose 55 which is connected to a hydraulic pump. Once both bearings have been seated into the bore remove pin 20 which allows removal of the threaded rod with the threaded bushing attached therefore completing the installation of the bearings into the bore 73. FIG. 5 depicts an overview of a hard nose that includes a bore on each side that require the insertion of bearings as shown on one side of the hard nose. The invention has been shown and described in what is considered to be the most practical and preferred embodiments.

What is claimed is:

1. A method of installing bearings into a lift cylinder yoke bore comprising the steps of:
   a. attaching a threaded rod onto a threaded bushing;
   b. inserting the threaded rod attached to the threaded bushing into the lift cylinder yoke bore;
   c. inserting a pin into an opening in the threaded bearing, after removing a yoke keeper pin from the opening, and securing the pin in place within a distal end of the lift cylinder yoke bore;
   d. inserting a first bearing onto the threaded rod, where the first bearing has a first diameter;
   e. attaching a first push plate to the threaded rod;
   f. attaching a hydraulic push cylinder behind the first push plate onto the threaded rod;
   g. connecting a washer and a nut to the threaded rod;
   h. activating the hydraulic push cylinder to push the first push plate and the first bearing along the threaded rod;
   i. continuing to push the first push plate into the first bearing until the first bearing is seated into the bore;
   j. removing the nut, washer, hydraulic push cylinder, and first push plate from the threaded rod;
   k. placing a second bearing over the threaded rod where the second bearing has a second diameter;
   l. placing a second push plate onto the threaded rod;
   m. re-attaching the hydraulic push cylinder, washer and nut;
   n. pushing the second push plate along the threaded rod by activating the hydraulic push cylinder until the second bearing is seated into the lift cylinder yoke bore;
   o. removing the nut, washer, hydraulic push cylinder, and second push plate from the threaded rod; and
   p. pulling the pin from a side of lift cylinder yoke bore and removing the threaded rod with threaded bushing attached.

2. The method of installing bearings into a bore according to claim 1, where the first diameter is less than the second diameter.

3. The method of installing bearings into a bore according to claim 1, wherein the threaded rod is a high grade all thread material.

* * * * *